March 13, 1928.                 B. WOOD                 1,662,483

COLLAR STUD

Filed June 6, 1927

Inventor.
Basil Wood.
per Ferdinand Broster Bosshardt
Attorney.

Patented Mar. 13, 1928.

1,662,483

UNITED STATES PATENT OFFICE.

BASIL WOOD, OF MANCHESTER, ENGLAND.

COLLAR STUD.

Application filed June 6, 1927. Serial No. 196,849.

This invention relates to collar studs and the main object thereof is to provide an improved construction of the head and shank portions of collar studs which construction, whilst enabling the stud holes in the collar to be readily slipped over the head of the stud in either direction, secures the stud holes more effectively than hitherto from accidently slipping off the stud.

I attain this object by the construction shown in the accompanying sheet of drawings, wherein—

Figure 1 is a front elevation and

Figure 2 a side elevation of a collar stud intended for use with vertical stud holes.

Figure 1:
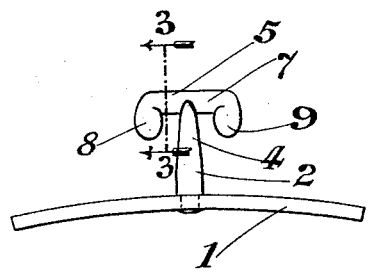
Figure 2:
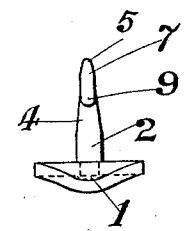
Figure 3:
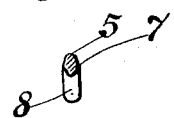
Figure 3 is a cross-section on line 3—3 of Figure 1 regarded in the direction of the arrows.

Referring to the drawings, in the collar stud according to Figures 1 to 3, 1 is the base which has attached to it a shank 2, 4 having a part 2 of uniform cross-section and a part 4 of tapering cross-section. The part 4 terminates in a head consisting of two straight, horizontal parts 5 and 7 having on their undersides flattened globular lugs 8 and 9 respectively which project downwardly only from the parts 5 and 7 at right angles thereto and are of substantially the same thickness as the parts 5 and 7. The parts 5 and 7 are of diamond-like shape in cross-section, see more particularly Figure 3.

The cross-sectional shape and the straightness of the parts 5 and 7 enables the said parts to be readily forced through the stud hole of the collar by first pushing an upper end or corner of the parts 5 and 7 into the stud hole, and as the lugs 8 and 9 are of substantially the same thickness as the thickest portion of the parts 5 and 7, they in no way obstruct or interfere with the slipping of the stud hole over them. The shank 2, 4 opens the stud hole to an increased extent as the hole is pushed towards the base 1, owing to the action of the taper part 4 and thus prepares the hole for easy engagement with one of the lugs 8 and 9 when unfastening the collar. The part 2 of unvarying cross-section however ensures that there shall be no unnecessary slackness between the opened stud hole and the shank 2, 4. Although the lugs 8 and 9 act efficiently to prevent the collar from accidently leaving the stud when the stud has been turned a quarter turn to bring the base into its correct position after the stud has been engaged in the stud holes, they aid the operation of disengaging the stud holes from the stud after the stud has been turned a quarter of a turn to bring the head parallel with the stud hole, because they are of flat globular form, are of less thickness than the part 2 of the shank and project in an outstanding manner below and at the extremities of the parts 5 and 7 and the rounded, outstanding lower extremity of one of the lugs 8 and 9 therefore readily finds and slips into the stud hole previously expanded by the part 4 and then acts to guide the stud hole upwardly onto and over the parts 5 and 7 and the other of the lugs 8 and 9. Thus whilst the stud is capable of retaining the collar firmly and securely in position, my improved shank and head render the pushing of the stud holes onto the stud and the removal of the stud holes from the stud more certain and easy than hitherto.

Figure 4:
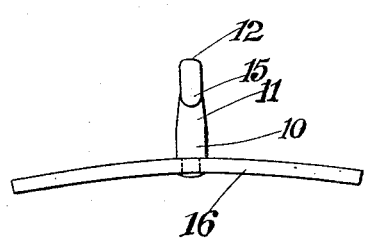
Figure 4 is a front elevation.
Figure 5:
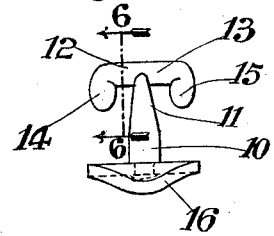
Figure 5 is a side elevation of a collar stud intended for use with horizontal stud holes.
Figure 6:
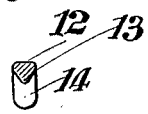
Figure 6 is a cross-section on line 6—6 of Figure 5 regarded in the direction of the arrows.

In Figures 4 to 6 the stud shown therein is slightly modified as compared with the stud shown in Figures 1 to 3, the form of the shank 10, 11 being similar to that of the shank 2, 4, but the cross-section of the parts 12 and 13 of the head being of substantially inverted triangular shape, see more particularly Figure 6. The lugs 14 and 15 projecting downwardly from the undersides of the parts 12 and 13 respectively are of substantially the same thickness as the thickest portions of the parts 12 and 13 and the shank 10 and 11 and the said head act in the manner described with reference to Figures 1 to 3. As the stud shown in Figures 4 to 6 is however intended for use in connection wth horizontal stud holes of collars, the base 16 is arranged at right angles to the said head.

I claim—

1. A collar stud comprising a base, a shank part of cylindrical unvarying cross-section provided thereon; a tapered shank part provided on the top of the cylindrical shank part and having its smallest cross-section at its upper end; straight, horizontal head parts provided on the top of the tapered shank part of the same thickness as the smallest end of the tapered shank part and flattened globular lugs of substantially the same thickness as the head parts provided on and depending only from the undersides of the said head parts and projecting from the said head parts at right angles thereto, for the hereinbefore specified purpose.

2. A collar stud according to claim 1, wherein the said head parts are of substantially diamond-shape in cross section.

3. A collar stud according to claim 1, wherein the said head parts have a cross-section which tapers on the underside.

In testimony whereof, I have signed my name to this specification at Manchester in the county of Lancaster, England, this 24th day of May, 1927.

BASIL WOOD.